J. C. KAMP & A. E. FINCH.
PULLEY.
APPLICATION FILED DEC. 18, 1912. RENEWED JAN. 27, 1915.
1,151,598.
Patented Aug. 31, 1915.
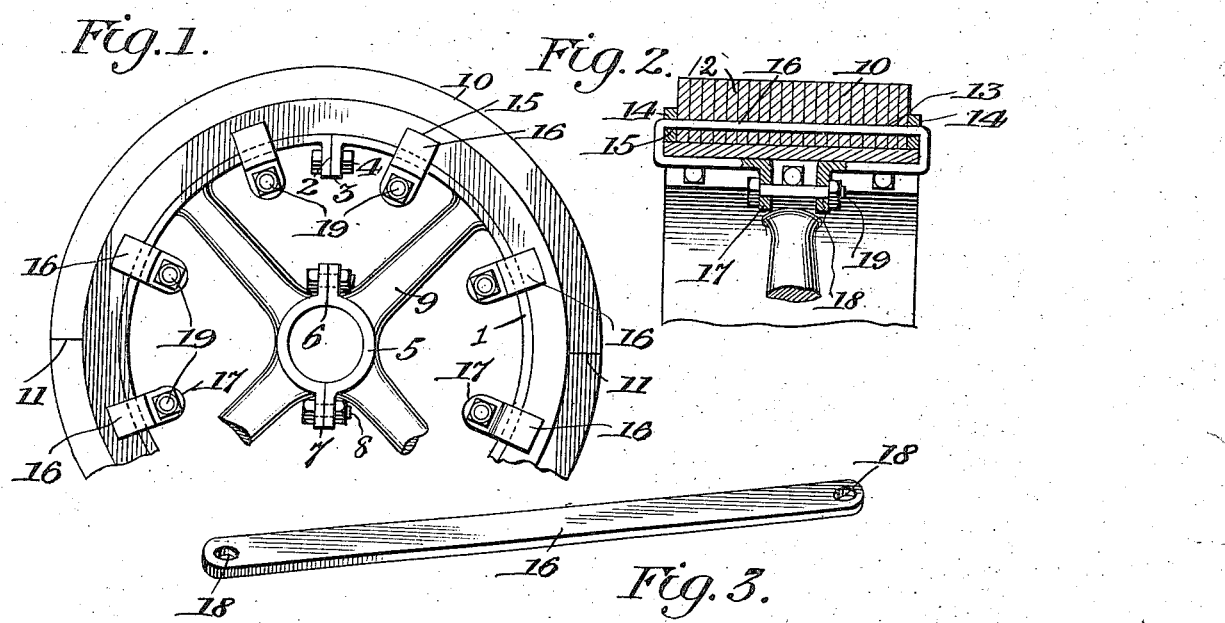

UNITED STATES PATENT OFFICE.

JOHN C. KAMP AND ALBERT E. FINCH, OF BUFFALO, NEW YORK.

PULLEY.

1,151,598. Specification of Letters Patent. Patented Aug. 31, 1915.

Application filed December 18, 1912, Serial No. 737,473. Renewed January 27, 1915. Serial No. 4,809.

*To all whom it may concern:*

Be it known that we, JOHN C. KAMP and ALBERT E. FINCH, citizens of the United States, residing at Buffalo, in the county of Erie and State of New York, have invented new and useful Improvements in Pulleys, of which the following is a specification.

This invention relates to pulleys for driving belts in all kinds of machinery, the object of the invention being to provide a built-up pulley, embodying, in connection with the rim, a tread member composed of material which will obtain an effective hold on the belt and enable the belt to run with slack therein, without liability of slippage between the belt and tread of the pulley, together with novel means for securing the tread member upon the rim of the pulley.

With the above and other objects in view, the invention consists in the construction, combination and arrangement of parts, as will be hereinaftter more fully described, illustrated in the accompanying drawings, and pointed out in the claim hereunto appended.

In the drawings: Figure 1 is a fragmentary side elevation of a pulley embodying the present invention. Fig. 2 is a detail cross section through a portion of the same. Fig. 3 is a detail perspective view of one of the straps.

The rim 1 of the pulley is made in sections divided diametrically on the line 2, and provided adjacent the ends of the sections with inwardly-extending lugs 3, through which are passed fastening bolts 4, by the removal of which the sections of the rim may be separated, in order to place the pulley over a shaft already mounted in its bearings. The pulley also comprises a hub 5 which is diametrically divided on the line 6, and provided with outwardly extending lugs 7 which are fastened together by bolts 8. The sections of the hub 5 are connected rigidly by spokes 9 to their respective rim sections, as clearly shown. Extending around the rim in contact therewith is a tread member 10 composed, preferably, of leather or an analogous material which will obtain a good frictional hold on the belt passing around the same. This tread member is preferably shown as composed of semi-circular sections diametrically divided along the line 11, and said tread member is further composed of any suitable number of laminations or plies 12, as shown in Fig. 2, the said laminations being cemented or otherwise firmly united together. Ordinarily, the laminations or plies 12 will be composed of particles of leather, or an analogous material, which have been ground and pressed together with the addition of any suitable binding agent, such as cement.

In order to secure the tread member upon the rim, said tread member is provided with holes 13 extending entirely through the same from side to side parallel to the axis of the pulley, as clearly shown in Fig. 2. Tread confining rings 14 are placed around the rim and against the outside faces of the tread member 10 and provided with holes 15 in line with the holes 13. Metal strips 16 are then passed through the holes in the tread, and also through the holes in the rings 14, and then bent over the side edges of the rim, and extended inwardly inside of the rim, where they are fastened.

In the preferred embodiment of the fastening means for the strips, each strip is provided with inturned end portions 17 which are formed with holes 18, through which is inserted a bolt 19, so that by tightening said bolt the strip may be tightly drawn around the edges of the rim and together upon the inside thereof, as clearly illustrated in Fig. 2. The strip thus acts to hold the tread member on the rim, and also acts to hold the rings 14 tightly against the opposite sides of the tread member, and also in fixed relation to the rim of the pulley.

What is claimed is:

A pulley comprising a rim, a tread member extending around the rim and provided with a flat working face and also with holes extending transversely therethrough parallel to the axis of the pulley, tread confining rings encircling said rim and supported by the outer faces of the tread member and provided with holes in line with said holes in the tread member, tread holding flat metal straps passing through each set of holes in the said tread member and rings, each strap having its end portions bent to bear against the inside face of the rim, and a clamping bolt inserted through the extremities of each strap.

In testimony whereof we affix our signatures in presence of two witnesses.

JOHN C. KAMP.
ALBERT E. FINCH.

Witnesses:
CHARLES A. HAHL,
THOS. C. WOZCIECHOWSKI.